(12) United States Patent
Hasegawa et al.

(10) Patent No.: US 11,487,286 B2
(45) Date of Patent: Nov. 1, 2022

(54) MOBILE OBJECT SYSTEM THAT PROVIDES A COMMODITY OR SERVICE

(71) Applicant: TOYOTA JIDOSHA KABUSHIKI KAISHA, Toyota (JP)

(72) Inventors: Hideo Hasegawa, Nagoya (JP); Tadahiro Kashiwai, Nagoya (JP); Yusuke Kaneko, Toyota (JP); Akihiro Yamaguchi, Toyota (JP); Yuki Ito, Iwakura (JP); Naoki Uenoyama, Nisshin (JP); Takahiro Shiga, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 72 days.

(21) Appl. No.: 16/717,364

(22) Filed: Dec. 17, 2019

(65) Prior Publication Data

US 2020/0233416 A1   Jul. 23, 2020

(30) Foreign Application Priority Data

Jan. 18, 2019   (JP) .............................. JP2019-007202

(51) Int. Cl.
*G05D 1/00* (2006.01)
*G05D 1/02* (2020.01)
*G06Q 10/08* (2012.01)
*B60P 3/025* (2006.01)

(52) U.S. Cl.
CPC ......... *G05D 1/0088* (2013.01); *G05D 1/0276* (2013.01); *G05D 1/0287* (2013.01); *G06Q 10/08* (2013.01); *B60P 3/025* (2013.01)

(58) Field of Classification Search
CPC .. G05D 1/0088; G05D 1/0276; G05D 1/0287; G06Q 10/08; B60P 3/025
See application file for complete search history.

(56) References Cited

U.S. PATENT DOCUMENTS

| 9,646,356 | B1* | 5/2017 | Schwie | ............... | G05D 1/0088 |
| 2002/0116284 | A1* | 8/2002 | Steelman | ............... | G06Q 10/02 |
| | | | | | 705/5 |
| 2013/0085817 | A1* | 4/2013 | Pinkus | ............... | G06Q 30/0207 |
| | | | | | 705/14.1 |

(Continued)

FOREIGN PATENT DOCUMENTS

| JP | 2008-3980 A | 1/2008 |
| JP | 2010-143558 A | 7/2010 |

(Continued)

*Primary Examiner* — Ramsey Refai
(74) *Attorney, Agent, or Firm* — Oblon, McClelland, Maier & Neustadt, L.L.P.

(57) ABSTRACT

A mobile object system includes: an information processing apparatus; and an autonomous travel vehicle. The information processing apparatus transmits to the autonomous travel vehicle first data and second data in association with each other, the first data being information for introducing a content of a commodity or a service to a user, the second data being information regarding a base that provides the commodity or service. The autonomous travel vehicle introduces the commodity or service to the user in the vehicle based on the first data, and moves to the base indicated in the second data upon reception of an instruction from the user.

3 Claims, 7 Drawing Sheets

(56) References Cited

U.S. PATENT DOCUMENTS

| | | | | |
|---|---|---|---|---|
| 2013/0253999 A1* | 9/2013 | Pinkus | ............... | G06Q 30/0264 |
| | | | | 705/14.16 |
| 2014/0108145 A1* | 4/2014 | Patel | ................. | G06Q 30/0257 |
| | | | | 705/14.54 |
| 2014/0229208 A1* | 8/2014 | Tamayo | ................. | G06Q 10/10 |
| | | | | 705/5 |
| 2017/0352267 A1* | 12/2017 | Tzirkel-Hancock | ... | B60K 35/00 |
| 2018/0053215 A1* | 2/2018 | e Costa | ................... | H04W 4/44 |
| 2018/0075754 A1* | 3/2018 | Salter | ..................... | G06Q 10/02 |
| 2018/0164809 A1* | 6/2018 | Moosaei | ........... | B60W 60/0025 |
| 2019/0265703 A1* | 8/2019 | Hicok | .................... | G06Q 50/30 |

FOREIGN PATENT DOCUMENTS

| | | |
|---|---|---|
| JP | 2014-098587 A | 5/2014 |
| WO | WO 2018/230596 A1 | 12/2018 |

* cited by examiner

FIG. 3A

COMMODITY DATA

| COMMODITY ID | G001 |
|---|---|
| BASE ID | S001 |
| IMAGE DATA | (Binary) |
| EXPLANATORY SENTENCES | (Text) |
| ... | ... |

FIG. 3B

BASE DATA

| BASE ID | S001 |
|---|---|
| NAME | ... |
| ADDRESS | ... |
| LOCATION INFORMATION | ... |
| PORCH LOCATION INFORMATION | ... |
| ... | ... |

FIG. 3C

PROVISION PROPRIETY DATA

| COMMODITY ID | G001 | G002 | ... |
|---|---|---|---|
| BASE ID | S001 | S001 | ... |
| PROVISION PROPRIETY | YES | NO | ... |
| ... | ... | ... | ... |

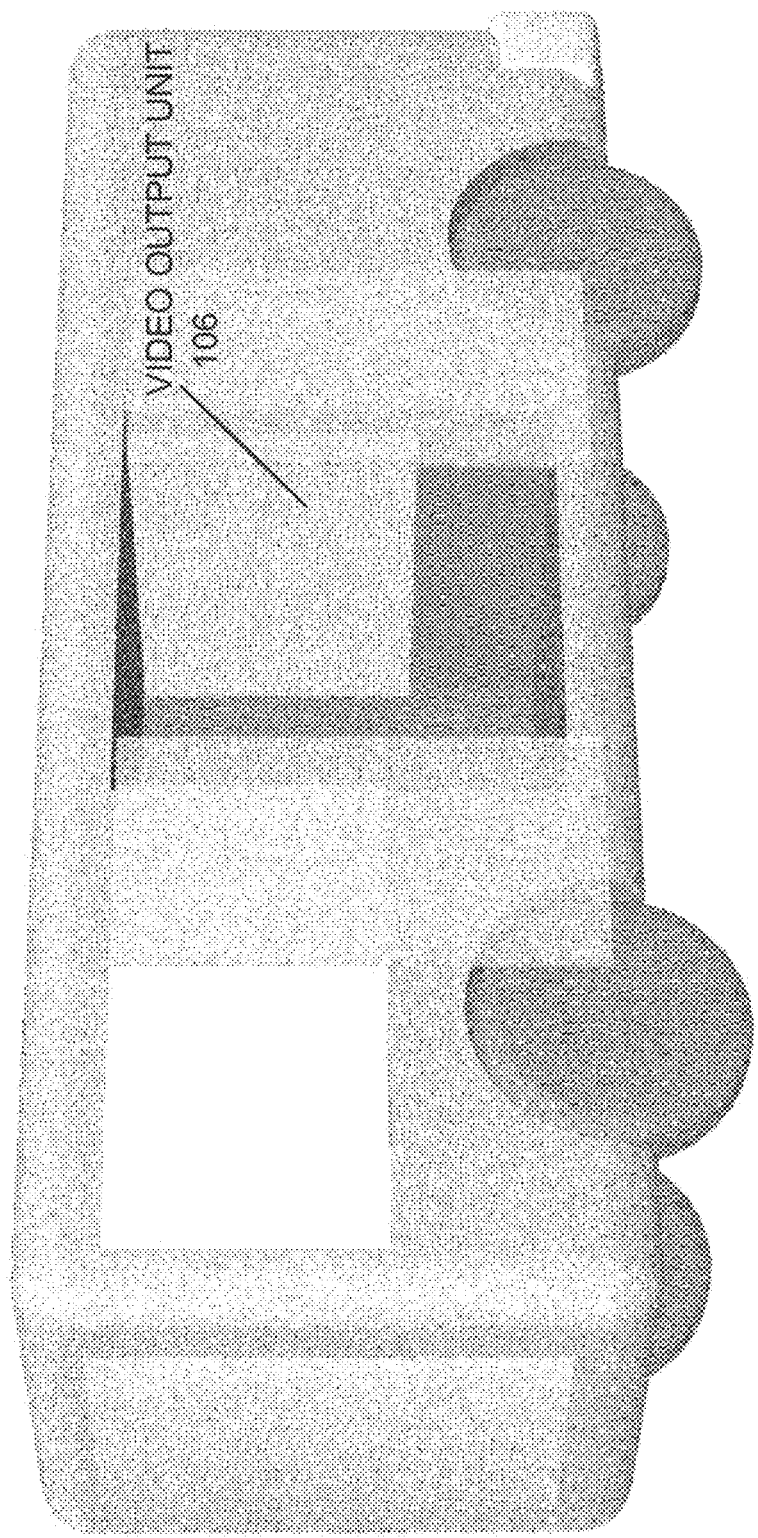

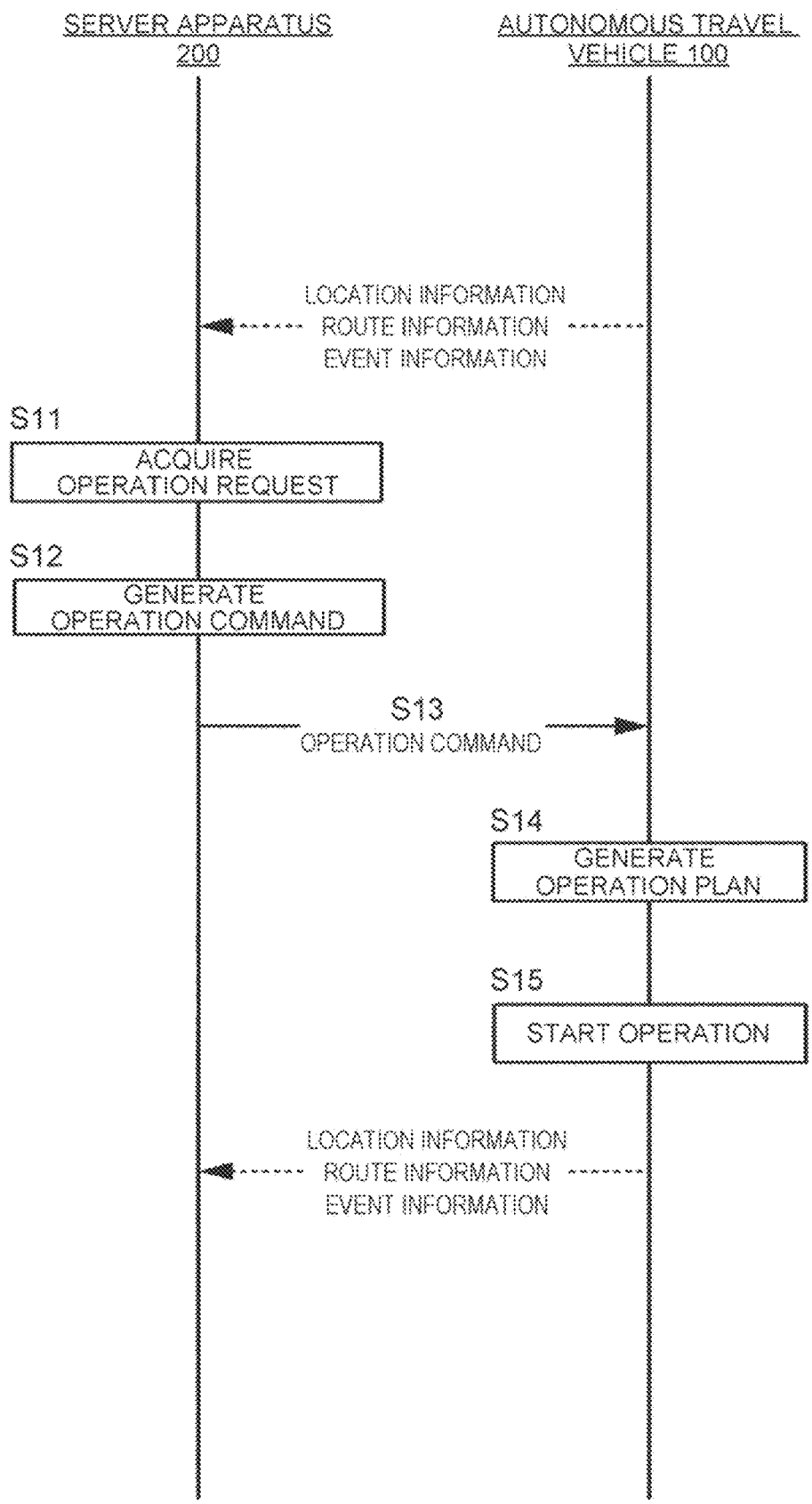

MOBILE OBJECT SYSTEM THAT PROVIDES A COMMODITY OR SERVICE

INCORPORATION BY REFERENCE

The disclosure of Japanese Patent Application No. 2019-007202 filed on Jan. 18, 2019 including the specification, drawings and abstract is incorporated herein by reference in its entirety.

BACKGROUND

1. Technical Field

The present disclosure relates to a service of providing movement.

2. Description of Related Art

Researches have been conducted on services using mobile objects. For example, Japanese Patent Application Publication No. 2010-143558 discloses a system that uses vehicles as mobile shops or exhibition sites. In recent years, researches have also vigorously been conducted on autonomous travel vehicles.

SUMMARY

Using mobile objects that travel autonomously makes it possible to provide a service for sending mobile objects that function as shops to users. However, autonomous mobile objects can provide only a limited variety of services and commodities, and it is difficult to satisfy the needs of all the users.

The present disclosure has been made in view of the above-described problem, and it is an object of the present disclosure to enhance the convenience in a mobile object system that provides a commodity or a service.

The mobile object system according to the present disclosure is a mobile object system including an information processing apparatus and an autonomous travel vehicle. The information processing apparatus transmits to the autonomous travel vehicle first data and second data in association with each other, the first data being information for introducing the content of a commodity or a service to a user, the second data being information regarding a base of providing the commodity or service. The autonomous travel vehicle introduces the commodity or service to the user in the vehicle based on the first data, and moves to the base indicated in the second data upon reception of an instruction from the user.

The present disclosure can enhance the convenience in the movable body system for providing a commodity or service.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3A illustrates presentation data;

FIG. 3B illustrates presentation data;

FIG. 3C illustrates presentation data;

FIG. 4 is an external view of an autonomous travel vehicle 100;

FIG. 5 is a flowchart showing a data flow between the component members of the system;

DETAILED DESCRIPTION OF EMBODIMENTS

Figure 1:
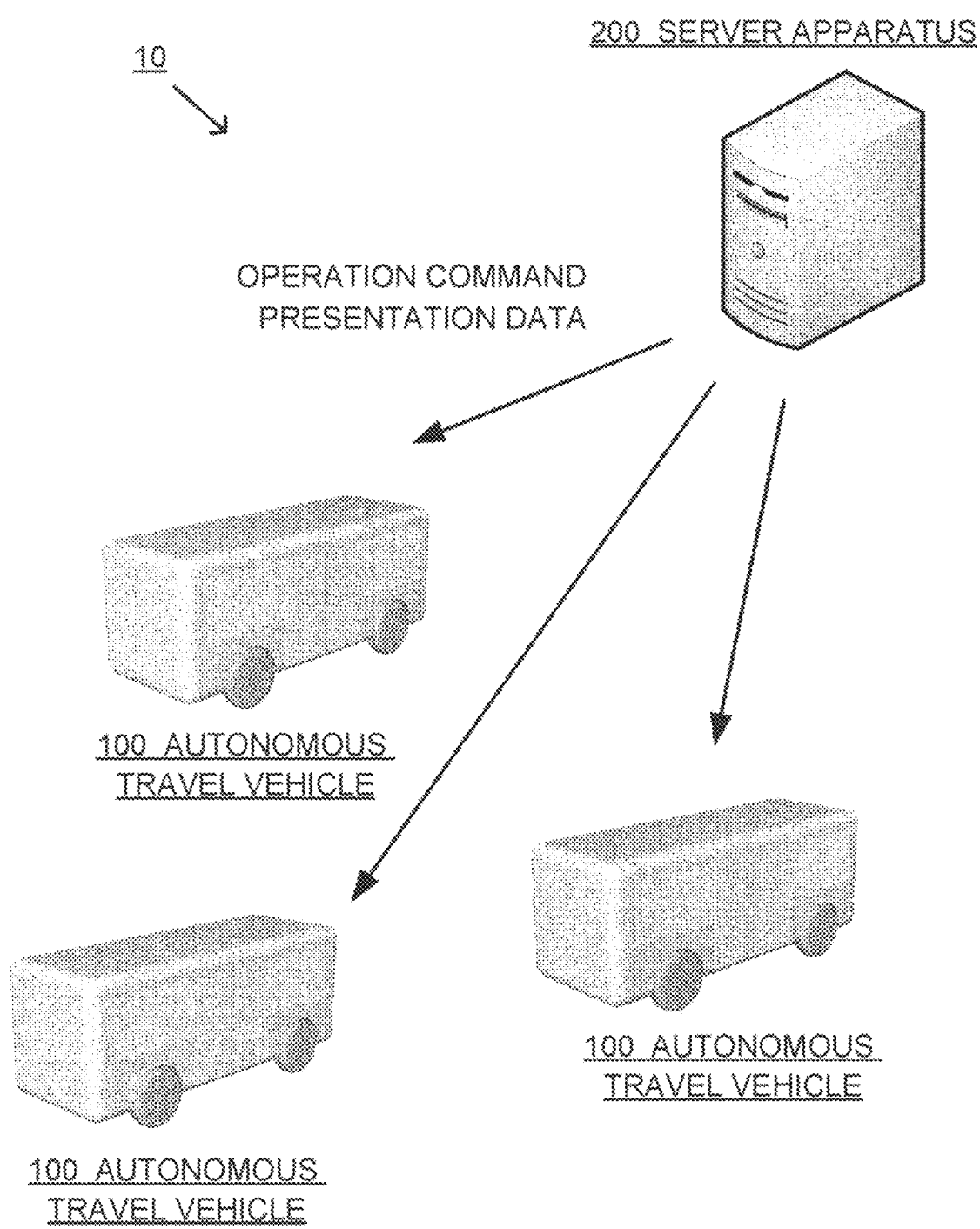
FIG. 1 is a schematic view of a mobile object system in a first embodiment.

There is considered a configuration of providing a commodity or a service by constituting a shop with a multipurpose mobile object that can travel autonomously. For example, a mobile shop vehicle having a facility and equipment in the vehicle for operating a shop is sent to a prescribed area, where the facility or equipment can be deployed to carry out a business. However, the commodities or services that can be provided by one mobile shop vehicle are limited, and the available commodities or services do not necessarily agree with the needs of users.

To cope with this situation, an embodiment of the present disclosure is configured as shown below. That is, an information processing apparatus for managing a mobile object system transmits to an autonomous travel vehicle first data and second data in association with each other, the first data being information for introducing the content of a commodity or a service to a user, the second data being information regarding a base that provides the commodity or service. The autonomous travel vehicle introduces (gives a presentation about) the commodity or service to the user in the vehicle based on the first data, and moves to the base indicated in the second data upon reception of an instruction from the user.

The first data is data for introducing the content of the commodity or service. The first data may be configured by including a video image, an image, a moving image, a voice, and the like. The first data may take any form as long as the content of the commodity or service can be introduced. The second data is information regarding a base (such as a shop) that provides the commodity or service. The second data may be, for example, location information regarding the shop that provides the commodity or service, information regarding operation of the shop, or the like. Based on an instruction of the user who received the presentation about the commodity or service, the autonomous travel vehicle according to the present disclosure carries the user to the base where the commodity or service is provided. According to the configuration, it becomes possible to provide the user with various commodities and services that are hard to be provided in the vehicle, and to thereby enhance the convenience of the user.

The first data may be data for introducing a room of an accommodation, and the second data may be data regarding the accommodation.

For example, the system may present an image corresponding to the room of the accommodation, and services (optional meals, and details thereof) provided to the user. When the user agrees with the presented commodity or service, the user may be transported to the accommodation. When such an autonomous travel vehicle is sent to locations (for example, midnight terminal stations, or the like) where there are users who need accommodations, the convenience of the users having the needs for accommodation may largely be enhanced.

The first data may also data for introducing a commodity, and the second data may be data regarding a shop for providing the commodity.

For example, the system may present the content, price, and effect of a commodity. When the user agrees with the presented commodity, the user may be transported to the shop that provides the commodity. When such an autonomous travel vehicle is sent to locations (for example, depopulated areas) where there are users having the needs for shopping, the convenience of the users having the needs for shopping may largely be enhanced.

The information processing apparatus may further transmit to the autonomous travel vehicle third data in association with the first data, the third data being information indicating whether the commodity or service is able to provide.

For example, when an object to be sold is a commodity, the third data may be the data regarding a stock status, or the like, of the commodity. When the object to be sold is an accommodation service, or the like, the third data may be the data regarding a reservation status (vacancy status), or the like, of the accommodation.

The information processing apparatus may periodically transmit only the third data to the plurality of autonomous travel vehicles. According to such configuration, the autonomous travel vehicles can share the latest information.

First Embodiment

The overview of a mobile object system 10 according to a first embodiment will be described with reference to FIG. 1. The mobile object system 10 according to the present embodiment is a system that transports a user by an autonomous travel vehicle in order to provide a commodity or service.

Specifically, the mobile object system 10 is configured by including a plurality of autonomous travel vehicles 100 that travel autonomously, and a server apparatus 200 that issues a command to the autonomous travel vehicles 100. The autonomous travel vehicles 100 provide prescribed services. The server apparatus 200 manages the autonomous travel vehicles 100.

The autonomous travel vehicles 100 are multi-purpose mobile objects that may have different functions, respectively. In the present embodiment, the autonomous travel vehicles 100 can move on the roads. Each of the autonomous travel vehicles 100 has facility and equipment in the vehicle for performing a presentation about a commodity or service. After traveling to their destinations, the autonomous travel vehicles 100 can deploy the facility and equipment to give a presentation to users. When the users who received the presentation agree, the autonomous travel vehicles 100 travel with users on the vehicles, and transport the users to the bases where the commodities or services are provided. The autonomous travel vehicles 100 are also called electric vehicle (EV) pallets. The autonomous travel vehicles 100 are not necessarily unmanned vehicles. For example, a staff such as an operating staff, and a security guard, may be aboard. The autonomous travel vehicles 100 may not necessarily be vehicles that can perform a completely autonomous travel. For example, the autonomous travel vehicles 100 may be vehicles that are driven by a person, or vehicles that assist driving in accordance with situations.

The server apparatus 200 commands the autonomous travel vehicles 100 to operate. The server apparatus 200 transmits data (hereinafter, presentation data) to the autonomous travel vehicles 100. The presentation data includes data (hereinafter, commodity data) for introducing a commodity or service to users in association with data (hereinafter, base data) regarding the base (service base) that provides the commodity or service. In the present embodiment, the server apparatus 200 commands the autonomous travel vehicles 100 to "perform a presentation about a prescribed commodity or service at a prescribed location, and transport a user or users who desire the commodity or service to a corresponding service base".

In the present embodiment, the server apparatus 200 manages travel locations and travel routes of the autonomous travel vehicles 100, selects an appropriate autonomous travel vehicle 100 for performing a presentation, and then transmits an operation command to the selected autonomous travel vehicle 100.

Figure 2:
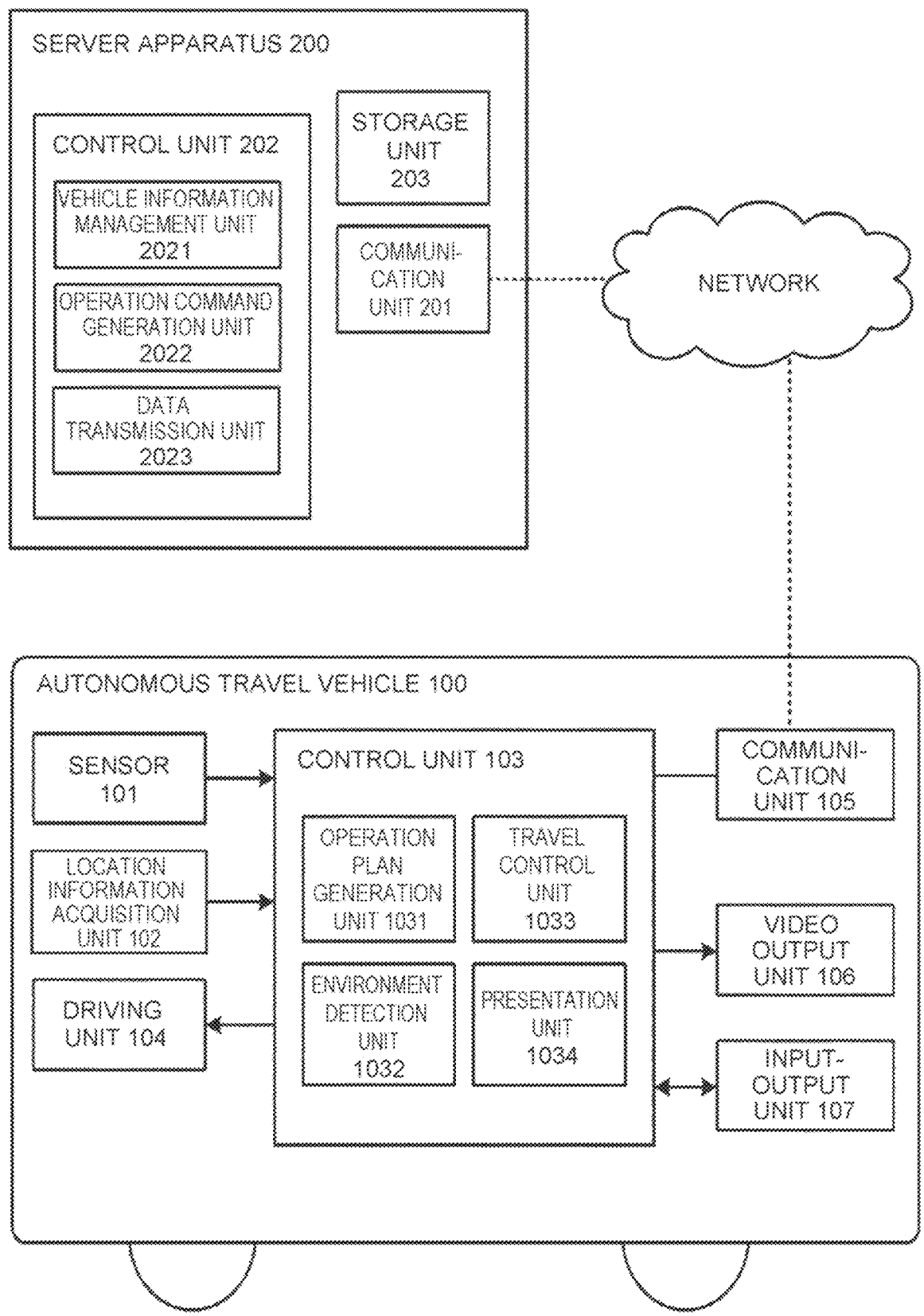
FIG. 2 is a block diagram schematically showing examples of component members included in the system.

Component members of the system will be described in detail. FIG. 2 is a block diagram schematically showing an example of the configuration of the autonomous travel vehicle 100 and the server apparatus 200 shown in FIG. 1.

The autonomous travel vehicle 100 is configured by including a sensor 101, a location information acquisition unit 102, a control unit 103, a driving unit 104, a communication unit 105, a video output unit 106, and an input-output unit 107. The autonomous travel vehicle 100 may be an internal combustion vehicle, or an electric vehicle. The autonomous travel vehicle 100 operates with electric power supplied from an electric generator or a battery.

The sensor 101 is means for sensing the state of the vehicle or the periphery of the vehicle. Examples of the sensor 101 for sensing the state of the vehicle may include an acceleration sensor, a speed sensor, and an azimuth angle sensor. Examples of the sensor 101 for sensing the periphery of the vehicle may include a laser scanner, a LIDAR, and a radar. The information acquired by the sensor 101 is transmitted to the control unit 103.

The sensor 101 may also include a camera provided in a vehicle body of the autonomous travel vehicle 100. For example, an image sensor, such as a charge-coupled device (CCD), a metal-oxide-semiconductor (MOS), or a complementary metal-oxide-semiconductor (CMOS), may be used. A plurality of cameras may be provided in a plurality of places on the vehicle body. For example, the cameras may be provided on a front side, a rear side, a right side, and a left side, respectively.

The location information acquisition unit 102 is means for acquiring the current location of the vehicle. The location information acquisition unit 102 is typically a global positioning system (GPS) device that receives GPS satellite signals and calculates location information. The location information obtained from the GPS device represents the latitude, longitude, and altitude. As long as the current location of the vehicle can be acquired, the location information acquisition unit 102 may be any positioning device by a global navigation satellite system (GNSS) other than GPS, and may be any positioning device by base station positioning.

The control unit 103 is a computer that controls the autonomous travel vehicle 100 based on the information acquired from the sensor 101. The control unit 103 is constituted of a microcomputer, for example.

The control unit 103 includes, as functional modules, an operation plan generation unit 1031, an environment detection unit 1032, a travel control unit 1033, and a presentation unit 1034. The functional modules may each be implemented by executing programs stored in storage means, such as a read only memory (ROM) (not illustrated), on a central processing unit (CPU) (not illustrated).

The operation plan generation unit 1031 generates an operation plan of the own vehicle based on an operation command acquired from the server apparatus 200. In the present embodiment, the operation plan is data for planning the operation of the vehicle. Examples of the operation plan may include the followings:

(1) Data Indicating Travel Route of Own Vehicle

For example, a travel route of the own vehicle may automatically be generated with reference to map data stored in storage means not illustrated and based on a given destination. The destination can be generated, for example, based on an operation command acquired from the server apparatus 200. When the user who received the presentation wishes to go to a service base, the destination may be set based on the base data. The travel route may also be generated by using external service.

(2) Data Indicating Processes to be Executed by Own Vehicle at Points on Route

Examples of the processes to be executed by the own vehicle may include "deploy the facility for a presentation", "receive presentation data from the server apparatus 200", "allow the user to ride on the vehicle and perform a presentation", and "notify people around the vehicle that the presentation is now available." However, the processes are not limited to these examples. The operation plan generated by the operation plan generation unit 1031 is transmitted to the travel control unit 1033 described later.

The environment detection unit 1032 detects the environment around the vehicle based on the data acquired by the sensor 101. Examples of detection targets include the number and location of lanes, the number and location of the vehicles present around the own vehicle, the number and location of obstacles (for example, pedestrians, bicycles, structures, buildings, and the like) present around the own vehicle, the structure of roads, and road signs. However, the detection targets are not limited to these. The detection targets may be any objects as long as the objects are necessary for autonomous traveling. The environment detection unit 1032 may track a detected object. For example, a relative speed of the object may be obtained from a difference between coordinates of the object detected one step before and current coordinates of the object. The data about environment (hereinafter, environment data) detected by the environment detection unit 1032 is transmitted to the travel control unit 1033 described later.

The travel control unit 1033 controls traveling of the own vehicle based on the operation plan generated by the operation plan generation unit 1031, the environment data generated by the environment detection unit 1032, and the location information regarding the own vehicle acquired by the location information acquisition unit 102. For example, the travel control unit 1033 makes the own vehicle travel along a specified route while preventing obstacles from entering into a specified safety area around the own vehicle. As a method for performing autonomous travel of the vehicle, a publicly-known method may be adopted.

The presentation unit 1034 acquires presentation data from the server apparatus 200, and performs a presentation to the user based on the presentation data. Specifically, the presentation unit 1034 executes a process of receiving presentation data from the server apparatus 200 and temporarily storing the presentation data, and a process of generating a video image based on commodity data included in the presentation data and providing the user with the video image through the later-described video output unit 106.

Here, the presentation data will be described. FIGS. 3A, 3B, and 3C are examples of the presentation data transmitted to the autonomous travel vehicle 100 from the server apparatus 200. The presentation data is configured with commodity data and base data.

The commodity data relates to a commodity or service introduced to the user. The commodity data is configured by including an ID for uniquely identifying a commodity or service, an ID for uniquely identifying a base that provides the commodity or service, and image data and texts (explanatory sentences) used for performing a presentation. The image data and explanatory sentences may have any format as long as they can be input by the video output unit 106. The commodity data is defined for every commodity or service. For example, when an object to be sold is a commodity, the commodity data may be defined for every Japan Article Number (JAN) code. When an object to be sold is an accommodation service, the commodity data may be defined for every room type.

The base data is about a base (service base) that provides a commodity or service. The base data is configured by including an ID for uniquely identifying a service base, a name of the service base, an address of the service base, and location information regarding the service base or a carriage porch thereof.

The commodity data is used for the presentation given to the user. The base data is used when the autonomous travel vehicle 100 goes to the service base based on the wishes of the user. In the examples of FIGS. 3A, 3B, and 3C, one piece of commodity data and one piece of base data are illustrated. However, the presentation data may include a plurality of pieces of commodity data and a plurality of pieces of base data. One piece of base data may be associated with a plurality of pieces of commodity data, and one piece of commodity data may be associated with a plurality of pieces of base data.

The driving unit 104 is means for making the autonomous travel vehicle 100 travel based on a command generated by the travel control unit 1033. The driving unit 104 is configured by including, for example, a motor, an inverter, a brake, a steering mechanism, and a secondary battery for driving wheels. The communication unit 105 is communication means for connecting the autonomous travel vehicle 100 to a network. In the present embodiment, the communication unit 105 can communicate with other apparatuses (for example, server apparatus 200) via a network with use of a mobile communication service, such as 3G and LTE. The communication unit 105 may further include communication means for performing vehicle-to-vehicle communication with other autonomous travel vehicles 100.

The video output unit 106 is means for providing the user in the vehicle with a video image. In the present embodiment, the autonomous travel vehicle 100 has a display device as shown in FIG. 4 in a vehicle cabin so as to be able to output any images. The display device may be a liquid crystal display device, a head mount display device, or the like. When the video output unit 106 is configured by including a display, the display may be a plurality of display devices disposed in the vehicle. For example, the display devices may be disposed at the positions around the user so as to provide the user with a sense of realism.

The input-output unit 107 is means for interacting with the user. Specifically, the input-output unit 107 is configured by including means for receiving input from the user, and means for providing information to the user. For example, when a commodity is introduced to the user, the input-output unit 107 acquires indication of an intention that the user desires to purchase the commodity, from the user. The input-output unit 107 may also provide information regarding the service base, and traffic information (time required to the service base, or the like) to the user.

Description is now given of the server apparatus 200. The server apparatus 200 is configured to manage travel positions and travel routes of the autonomous travel vehicles 100, and generates operation commands to the autonomous travel vehicles 100. For example, when receiving an operation request from the administrator of the system, the server apparatus 200 identifies the location where a presentation is performed, and then selects an appropriate autonomous travel vehicle 100 (that can function as a vehicle that performs the presentation) traveling in the vicinity of the location, and transmits an operation command to the vehicle.

The server apparatus 200 is configured by including a communication unit 201, a control unit 202, and a storage unit 203. The communication unit 201 is a communication interface, similar to the communication unit 105, for communication with the autonomous travel vehicles 100 via a network.

The control unit 202 is means for controlling the server apparatus 200. The control unit 202 is constituted of a CPU, for example. The control unit 202 has a vehicle information management unit 2021, an operation command generation unit 2022, and a data transmission unit 2023 as functional modules. The functional modules may each be implemented by executing programs stored in storage means, such as a ROM (not illustrated), on the CPU (not illustrated)).

The vehicle information management unit 2021 manages the autonomous travel vehicles 100 under management. Specifically, the vehicle information management unit 2021 receives from the autonomous travel vehicles 100 location information, route information, event information, and the like for every prescribed cycle, and stores the information in association with date and time in the storage unit 203 described later. The location information indicates the current location of the autonomous travel vehicle 100. The route information relates to a route on which the autonomous travel vehicle 100 is scheduled to travel. The event information relates to events that occur in the autonomous travel vehicle 100 in operation (for example, starting and ending a presentation, boarding and dropping a user, arriving at a destination, and the like).

The vehicle information management unit 2021 retains and updates data (hereinafter, vehicle information) regarding the characteristics of the autonomous travel vehicle 100 as necessary. Examples of the vehicle information include an identifier of the autonomous travel vehicle 100, usage and type, a door type, a vehicle body size, a load capacity, a passenger capacity, a travelable distance at full charge state, a current travelable distance, and current status (waiting, vacant, in service, traveling, in business, or the like). However, the vehicle information may be other than these pieces of information.

When receiving an operation request of the autonomous travel vehicle 100 from the outside, the operation command generation unit 2022 determines which autonomous travel vehicle 100 to send, and generates an operation command corresponding to the operation request. The operation request is a request for performing a presentation at a prescribed location. The request may include information regarding a destination, as well as an attribute of the autonomous travel vehicle 100 to send, and a time slot. For example, the operation request may be issued by an administrator of the system or a management agency The autonomous travel vehicle 100 to which the operation command is transmitted is determined in accordance with information, such as the location information and vehicle information (indicating whether or not a presentation can be conducted) acquired by the vehicle information management unit 2021.

The data transmission unit 2023 transmits presentation data to the autonomous travel vehicle 100. The presentation data is generated by the system administrator in advance, and stored in the storage unit 203. The data transmission unit 2023 extracts, out of the stored presentation data, data in conformity with the operation request, and transmits the extracted data to the autonomous travel vehicle 100.

The storage unit 203, which is means for storing information, is constituted of a storage medium, such as a RAM, a magnetic disk, or a flash memory.

The processes performed by the component members described before will be described. FIG. 5 is an explanatory view of a data flow after the server apparatus 200 generates an operation command based on the acquired operation request, and the autonomous travel vehicle 100 starts operation based on the generated operation command. The process shown in FIG. 5 is merely an example. The autonomous travel vehicle 100 may be operated based on processes different from the process of FIG. 5.

The autonomous travel vehicle 100 periodically transmits location information to the server apparatus 200. For example, when a road network is defined by nodes and links, the location information may be information that identifies a node and a link. The location information may also be a latitude, a longitude, or the like. The vehicle information management unit 2021 stores the received location information in association with the autonomous travel vehicle 100 in the storage unit 203. Whenever the autonomous travel vehicle 100 moves, the location information is updated.

The autonomous travel vehicle 100 also notifies route information and event information to the server apparatus 200 as necessary. The route information is transmitted when the autonomous travel vehicle 100 operates along a prescribed route. The event information is transmitted when an event is generated in the autonomous travel vehicle 100.

First, the server apparatus 200 (operation command generation unit 2022) acquires an operation request from the administrator of the system (step S11). The operation request includes a location, a time slot, or the like, for conducting a presentation. When it is desired to send the autonomous travel vehicle 100 having a specific function or attribute, the operation request may include information regarding the specified function or attribute. Examples of the location for conducting the presentation include parks, sites of public facilities, sites of apartment houses, parking lots, and traffic circles in front of the stations. However, the presentation may be conducted in other locations. In the present embodiment, the autonomous travel vehicle 100 performs a presentation of an accommodation in front of a station.

Next, the server apparatus 200 (operation command generation unit 2022) generates an operation command so as to send the autonomous travel vehicle 100 to a specified location and to start a presentation in response to the request (step S12). The operation command includes the following data:

Information for identifying a target autonomous travel vehicle 100

Information for identifying a location for performing a presentation

Information for identifying a time slot for performing the presentation

Information for identifying a presentation target

For example, the operation command includes information indicating "perform a presentation regarding a nearby accommodation today at 22:00 in the traffic circle in front of A station."

The autonomous travel vehicle 100 that transmits an operation command is determined based on the operation request and on the stored location information or vehicle information regarding the autonomous travel vehicle 100. For example, the operation command generation unit 2022 selects, with reference to these pieces of information, an autonomous travel vehicle 100 that can provide the requested service. The operation command generated by the operation command generation unit 2022 is transmitted to the autonomous travel vehicle 100 through the communication unit 201 (step S13).

In step S14, the autonomous travel vehicle 100 (operation plan generation unit 1031) generates an operation plan based on the received operation command. For example, the autonomous travel vehicle 100 generates an operation plan constituted of identifying a route to travel and a destination, conducting a presentation at the destination, transporting a user to an accommodation in response to the request of the user, and returning to a prescribed location after a business activity is ended.

The generated operation plan is transmitted to the travel control unit 1033, and operation is started (step S15). Transmission of the location information, or the like, to the server apparatus 200 is periodically performed while the autonomous travel vehicle 100 is in operation.

Figure 6:
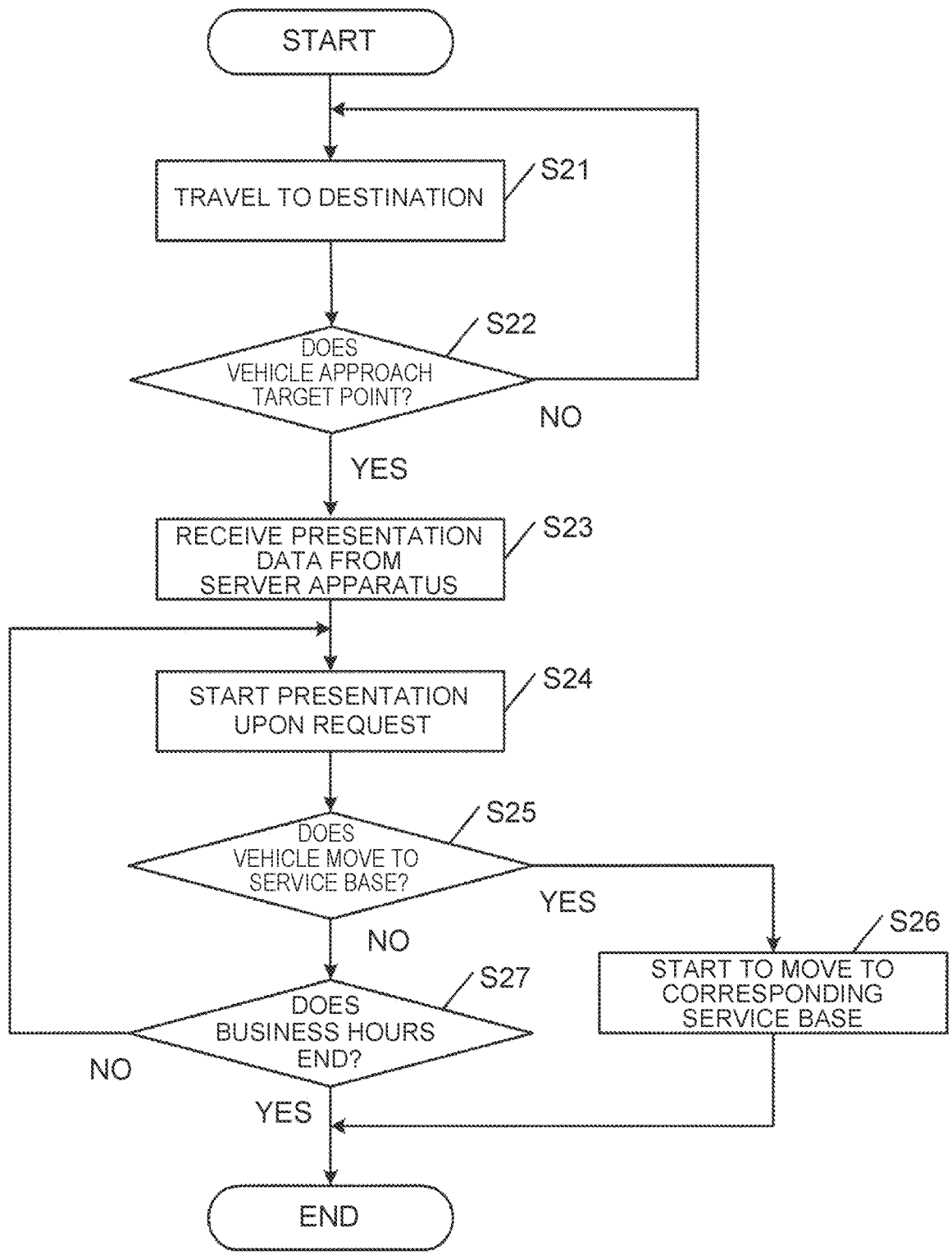
FIG. 6 is a flowchart of a process in the first embodiment.

FIG. 6 is a flowchart of the process performed by the autonomous travel vehicle 100 after the operation is started in step S15. First, in step S21, the travel control unit 1033 starts to travel toward the destination based on the generated operation plan. The destination is a location specified by the operation request.

When the autonomous travel vehicle 100 approaches a target point (step S22), the travel control unit 1033 searches for the location where vehicles can be parked in the vicinity of the target point, and the presentation unit 1034 starts preparation of presentation equipment (step S23). In step S23, the autonomous travel vehicle receives the presentation data of a specified attribute from the server apparatus 200, and temporarily stores the data. In the present example, the autonomous travel vehicle receives presentation data on site. However, the autonomous travel vehicle 100 may download the presentation data from the server apparatus 200 in advance.

In step S23, the server apparatus 200 may transmit to the autonomous travel vehicle 100 the presentation data of a type (attribute) specified in the operation request. For example, the server apparatus 200 transmits the presentation data corresponding to "accommodations in the vicinity of A station" to the autonomous travel vehicle 100.

When preparation of the presentation is completed, the autonomous travel vehicle 100 starts a presentation to the user in step S24. For example, the autonomous travel vehicle 100 notifies users around the vehicle, and allows a user or users who ride on the vehicle to view the presentation through the video output unit 106. When a plurality of commodities and services are included in the presentation data, the users may be allowed to select a commodity or service to view.

In step S25, the autonomous travel vehicle 100 may determines whether or not to move to the service base where the introduced commodity or service is provided based on the input acquired from the users. For example, when one of the users indicates through the input-output unit 107 an intention of wishing to visit the service base where the introduced commodity or service is provided, the process shifts to step S26.

In step S26, the autonomous travel vehicle 100 starts to move toward a corresponding service base. Specifically, the operation plan generation unit 1031 corrects the generated operation plan in order to go to the service base indicated by the base data, and starts an autonomous travel.

When there is no indication of intention of wishing to visit the service base where the introduced commodity or service is provided, the autonomous travel vehicle 100 determines whether or not the set business hours end in step S27. Here, when negative determination is made, the process returns to step S24. When positive determination is made, the autonomous travel vehicle 100 performs post-processing in accordance with the operation plan. For example, the autonomous travel vehicle 100 may collect the presentation equipment, and return to the prescribed base.

As described in the foregoing, in the mobile object system according to the first embodiment, a presentation of a commodity or service is performed with an autonomous travel vehicle. When a user agrees, the autonomous travel vehicle guides the user to a service base where the commodity or service is provided. Such configuration makes it possible to provide various commodities and services which are difficult to provide by a single autonomous travel vehicle.

Second Embodiment

In the first embodiment, the autonomous travel vehicle 100 conducts a presentation to a user inside the vehicle. In a second embodiment, a commodity or service that can be presented is notified in advance to a mobile terminal possessed by a user.

Figure 7:
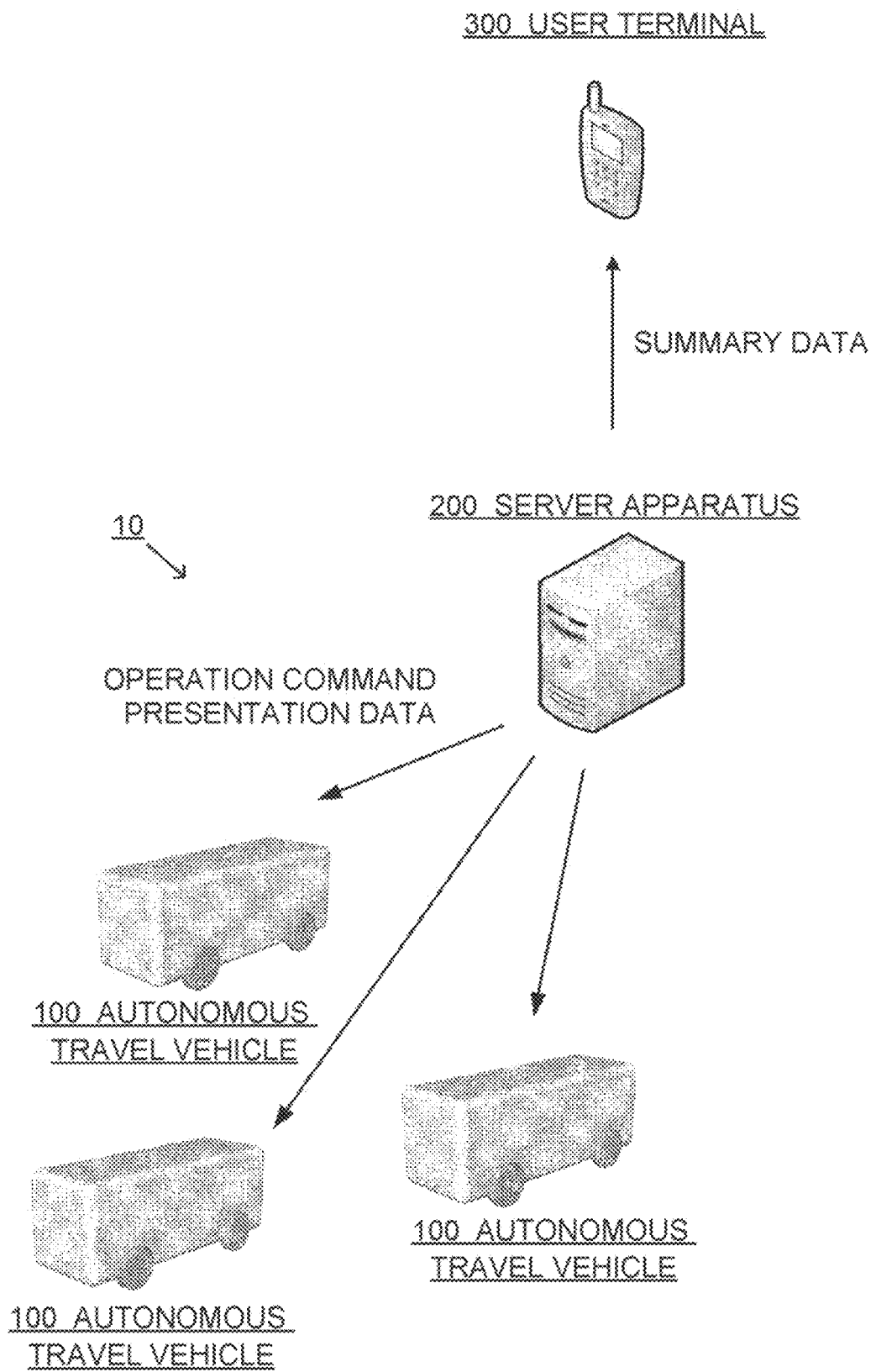
FIG. 7 is a schematic view of a mobile object system in a second embodiment.

FIG. 7 shows the configuration of a mobile object system in the second embodiment. As shown in FIG. 7, the mobile object system according to the present embodiment is configured by further including a user terminal 300 that can be connected to a network.

In the second embodiment, at the timing of transmitting presentation data to the autonomous travel vehicle 100, the data transmission unit 2023 included in the server apparatus 200 transmits information (hereinafter, summary data) regarding a commodity or service included in the presentation data to the user terminal 300. Examples of the information transmitted to the user terminal 300 may include an identifier of the autonomous travel vehicle 100 that conducts a presentation, a location and time for conducting the presentation, the name of commodity or service, and a summary of the commodity or service. Thus, the user can be notified that "information regarding a hotel that can provide a room to stay is available in front of A station at 22:00", for example.

In this example, the server apparatus 200 transmits the summary data to the user terminal 300 at the timing of transmitting the presentation data to the autonomous travel vehicle 100. However, the timing of transmitting the summary data is not limited to this. For example, the summary data may be generated and transmitted to the user terminal 300 at the timing when an operation request is issued and an autonomous travel vehicle 100 to be sent is determined.

The user terminal 300 to which the summary data is transmitted may be determined by any methods. For example, users who are present in the vicinity of a corresponding location in the time slot where a presentation is conducted may be estimated, and the user terminals 300 to which the summary data is transmitted may be determined based on the estimation result. The user terminals 300 may be determined in accordance with the content (information of interest, or the like) registered in advance.

Third Embodiment

In the first and second embodiments, only the content of a commodity or service is introduced to the user. However, whether the commodity or service can be provided may constantly change. For example, when the stock of commodities runs out, or accommodations are all booked, it is difficult for the user to receive these commodities or services. To cope with this situation, in a third embodiment, data regarding whether a commodity or service is able to provide is further transmitted to the autonomous travel vehicle 100.

In the third embodiment, the server apparatus 200 transmits to the autonomous travel vehicle 100 data (hereinafter, provision propriety data) regarding whether a commodity or service is able to provide as shown in FIG. 3C. The provision propriety data may be transmitted at the same time with the presentation data, or may be transmitted independently of the presentation data. For example, when the autonomous travel vehicle 100 has a certain pieces of presentation data, the autonomous travel vehicle 100 may periodically request for the corresponding provision propriety data to the server apparatus 200 to update the data.

According to the third embodiment, the autonomous travel vehicle 100 can recognize information regarding the latest stock status of the commodity, or the provision propriety of the service. Hence, it is possible to take an action, such as suspending execution of the presentation, for the commodity or service that is not able to provide to the user.

Modification

The aforementioned embodiments are merely examples, and the present disclosure can suitably be changed without departing from the scope of the present disclosure. The processes or devices described in the present disclosure can freely be combined and implemented without departing from the range of technical consistency.

Moreover, the process described to be performed by one apparatus may be executed by a plurality of apparatuses in cooperation with each other. Alternatively, the processes described to be executed by different apparatuses may be executed by one apparatus. In the computer system, the hardware configuration (server configuration) that implements each function may flexibly be changed.

The present disclosure can also be implemented when a computer program, mounted with the functions described in the embodiments, is supplied to a computer, and one or more processors included in the computer read and execute the program. Such a computer program may be provided to the computer by a non-transitory computer readable storage medium that is connectable with a system bus of the computer, or may be provided to the computer through a network. Examples of the non-transitory computer readable storage medium include disks of any type, including magnetic disks (such as floppy (registered trademark) disks, and hard disk drives (HDD)) and optical discs (such as CD-ROM, DVD discs, Blu-ray Disc), and media of any type suitable for storing electronic commands, including read only memories (ROM), random-access memories (RAM), EPROMs, EEPROMs, magnetic cards, flash memories, and optical cards.

What is claimed is:

1. A mobile object system, comprising:
an information processing apparatus; and
an autonomous travel vehicle, wherein
the information processing apparatus transmits to the autonomous travel vehicle first data and second data in association with each other, the first data being information for introducing commodity data for room types of an accommodation service to a user, the second data being information regarding a base that provides the commodity data, and
the autonomous travel vehicle introduces the commodity data to the user in the vehicle based on the first data after the autonomous travel vehicle parks at a target point, and, when the user selects one of the room types of the accommodation service, the autonomous travel vehicle moves to the base indicated in the second data.

2. The mobile object system according to claim 1, wherein the information processing apparatus further transmits to the autonomous travel vehicle third data in association with the first data, the third data being information indicating whether the commodity data or service is able to provide.

3. The mobile object system according to claim 2, wherein the information processing apparatus periodically transmits only the third data to the plurality of autonomous travel vehicles.

* * * * *